UNITED STATES PATENT OFFICE.

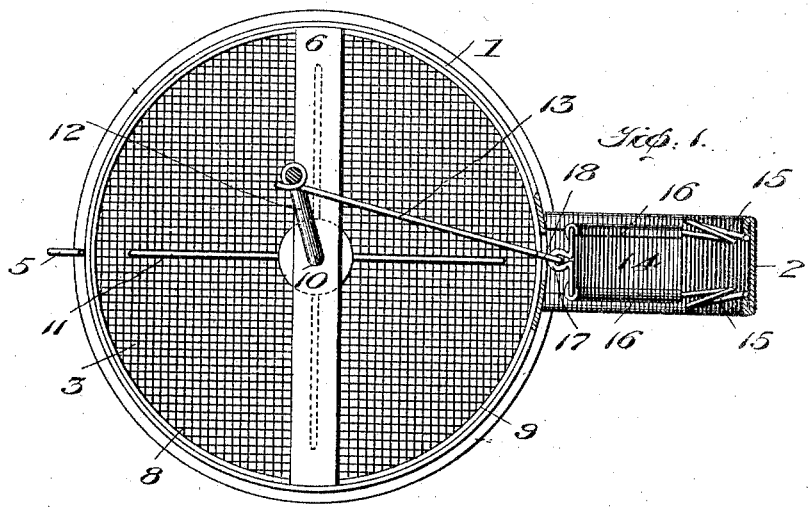
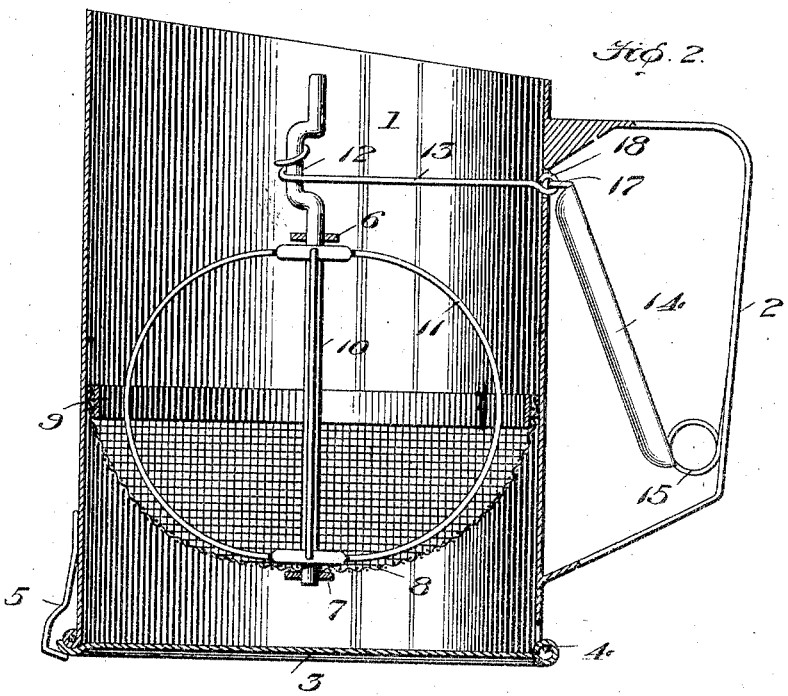

NICHOLAS F. DAUMEYER, OF NORWOOD, OHIO.

FLOUR-SIFTER.

967,109.

Specification of Letters Patent. Patented Aug. 9, 1910.

Application filed April 20, 1910. Serial No. 556,532.

*To all whom it may concern:*

Be it known that I, NICHOLAS F. DAUMEYER, a citizen of the United States, residing at Norwood, county of Hamilton, and State of Ohio, have invented certain new and useful Improvements in Flour-Sifters, of which the following is a specification.

My invention relates to flour sifters.

The object of the present invention is the provision of a flour sifter of simple, inexpensive, compact and durable construction having a hinged bottom which can be conveniently opened and closed, and provided with a sifting or screen septum shaped and mounted in a new manner within the shell of the device, an agitator arranged, constructed and mounted in a novel fashion to co-act with the sifting or screen septum, and an operating handle mounted in a novel fashion within the usual handle of the sifter so that it can be conveniently grasped by the same hand which holds the sifter to thereby manipulate the agitator as may be desired, said handle being operatively connected to the agitator in a new manner, all as more fully set forth hereinafter.

In the accompanying drawings: Figure 1 is a plan view, with the crank of the agitator, and the upper part of the main handle in section; and Fig. 2, a vertical section of the device, the agitator and its operating mechanism being shown in full lines.

The shell or cup 1 is provided with any usual type of handle 2. The shell has a bottom 3 which is hinged at 4 and held by a spring-latch at 5. The bottom 3 may be readily released with one hand while the sifter is being grasped by the handle 2, but if it is desired to close the bottom 3, it is not necessary to use the hand to accomplish this, as by pressing or striking the bottom against the table or other object, the bottom will snap into engagement with the latch 5.

Extending crosswise of the shell are the bearing members 6 and 7 and above the member 7 is the screen or sifter septum or bottom 8 which is more or less semispherical, being connected to the shell 1 by an annular band 9 and preferably resting on the cross member 7.

Journaled in the members 6 and 7 is the shaft 10 which has the agitator 11 consisting of bowed wires which more or less engage the septum 8 to insure sifting of the flour or other material therethrough. The shaft 10 is provided with a crank 12 which is connected by a stout wire 13 to an operating handle 14 mounted by springs 15 which are secured to the handle 2. Preferably, the springs 15 are formed from the same piece of spring wire which runs through the beads 16 on the handle 14 and whose intermediate part is formed into an eye 17 which is engaged with an eye 18 on the flexible wire 13. This construction is both cheap and strong. The springs 15 may be connected by soldering, riveting, or in any other preferred manner, to the handle 2.

The handle 14, being disposed inside of handle 2 and spring-pivoted at its lower end, is conveniently arranged to be grasped by the same hand that holds the sifter and to be operated against the tension of the springs 15, by the fingers, but the disposition of the handle 14 is such that a relatively large space is left in the handle 2 to receive the fingers of the user when it is desired simply to carry the device from place to place. When the bottom 3 is to be opened, the disengaged hand of the user can release the latch 5, but to close the bottom 3 does not require hand manipulation as the bottom can be lightly struck against the table or other object and will snap itself closed.

Having thus described my invention, what I claim as new and desire to secure by Letters Patent, is:—

The herein described flour sifter, consisting of a cup or shell having a rounded screen bottom, upper and lower cross-bearing members, an agitator having a vertical shaft journaled in said upper and lower cross-bearing members formed into a crank at its upper end above the upper bearing member, said agitator being adapted to cause the material to pass through the screen, a handle for said cup or shell, an operating handle located within said handle, a spring connecting the said handles and serving as a support for the operating handle and to actuate it, and a rod connecting the free end of the operating handle with the crank.

In testimony whereof, I hereunto affix my signature in presence of two witnesses.

NICHOLAS F. DAUMEYER.

Witnesses:
F. G. ROSSWINKEL,
JNO. C. HUSS.